May 18, 1948.  A. F. SHAFTER  2,441,941
ELECTRIC CORN POPPER
Filed Nov. 9, 1945  2 Sheets-Sheet 1
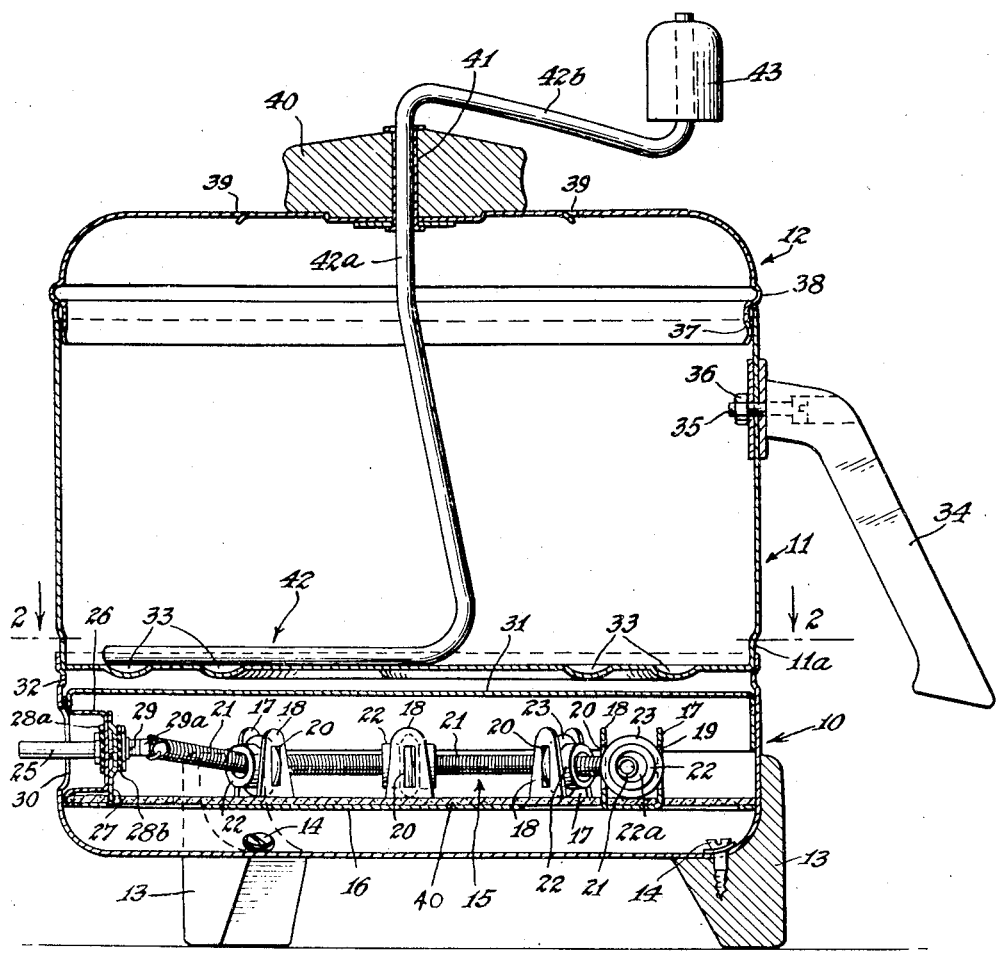
INVENTOR
ADOLPH F. SHAFTER
BY
ATTORNEYS

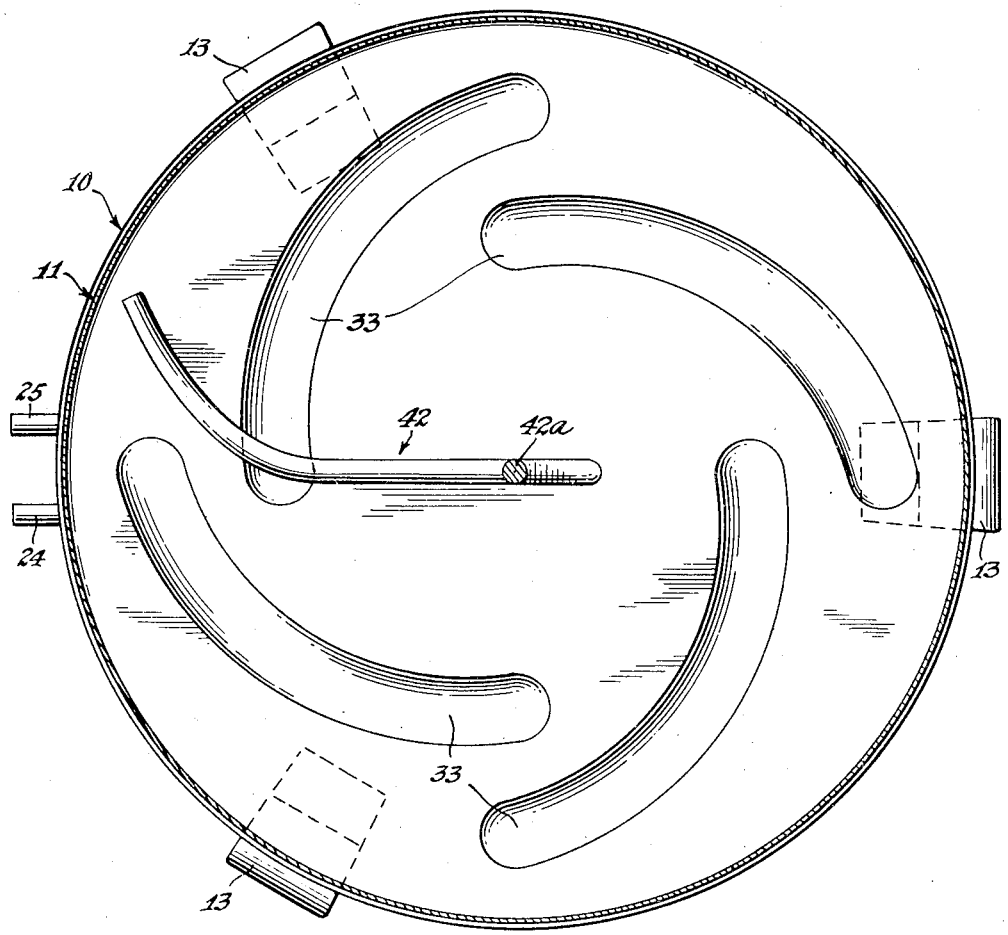

Patented May 18, 1948

2,441,941

UNITED STATES PATENT OFFICE 2,441,941

ELECTRIC CORN POPPER

Adolph F. Shafter, Decatur, Ill., assignor to U. S. Manufacturing Corporation, Decatur, Ill., a corporation of Illinois Application November 9, 1945, Serial No. 627,650

4 Claims. (Cl. 219—43)

This invention relates to electric corn poppers or the like.

A principal object of the invention is to provide a device of this character in which the popping pan is removable from the heating unit, so that it may be lifted readily therefrom and easily handled for emptying or otherwise without danger of burning the user.

An additional feature of the invention is that the removable nature of the popping pan renders possible its immersion in soap and water for cleaning purposes without danger of damage to the heating element.

Another object of the invention is to provide novel heating unit construction whereby it is possible to secure satisfactory popping of corn with reduced heating element temperatures over those conventionally used. This enables the use of modern plastic materials for parts of the popper that heretofore could not be used because of the excessively high temperatures of the older type heating units required for popping the corn.

A further object of the invention is to provide a device of the character described that is simple to manufacture and that may be readily and quickly assembled.

A further object of the invention is to provide a device of the character described that is safe to use and is rugged in construction so as to be able to withstand considerable abuse during use.

To the accomplishment of the foregoing and such other objects as may hereinafter appear, this invention consists in the novel construction and arrangement of parts hereinafter described and then sought to be defined in the appended claims, reference being had to the accompanying drawing, forming a part hereof, which shows merely for the purposes of illustrative disclosure, a preferred embodiment of the invention, it being expressly understood, however, that changes may be made in practice within the scope of the claims without digressing from the inventive ideas.

In the drawing:

Fig. 1 is a vertical section of a corn popper embodying the invention; and

Fig. 2 is a transverse section taken along line 2—2 of Fig. 1.

Referring to the drawing, the device comprises generally the base 10, the popping pan or receptacle 11 and a cover 12.

The base 10 has generally cup-like configuration and is preferably of metal. Feet 13 are secured at appropriate points to the base as by screws 14 or the like. These feet 13 may be of plastic material, of wood or of any other suitable material and serve to elevate the bottom of the base sufficiently from the surface on which the base is positioned in use to prevent heat damage to such surface.

An electric heating unit 15 is supported suitably within the base 10. In the embodiment shown, 16 denotes a disc or plate-like member preferably of thin metal. This member has substantially circular form and is admeasured in diameter to fit frictionally within the base 10. This disc 16 is provided in its surface with a plurality of sets of stamped out flanges or wings 17, 18 that are bent to extend laterally of the face of the plate or disc 16. These flanges 17, 18 of each set extend parallelly with respect to each other, and the sets of flanges 17, 18 are arranged concentrically about the center of the disc 16. The flanges 17 and 18 are provided, respectively, with the facing, vertically or longitudinally extending slots 19, 20 spaced vertically from the face of member 16 for a purpose presently to be described.

An electrical resistance heating coil 21 is provided which is adapted to be supported in spaced relationship from and by the flanges 17, 18. To this end, the tubular members 22 of insulating material such as porcelain or other ceramic or heat resisting and insulating materials, are provided. Each tubular member 22 has a surface projection, for example in the form of an annular enlarged portion or bead 23. The diameters of these beads 23 are admeasured so that they will extend at opposite sides of the tubular members into the oppositely facing slots 19, 20 provided in each pair or set of flanges 17, 18. The said flanges 17, 18 possess sufficient resiliency to be spread for the insertion of the beads 23 within the said slots 19, 20 and to thereafter spring together to retain the tubular members 22 securely on the flanges 17, 18. The heating element 21 is threaded through the openings 22a in the tubular members 22 and, because of the concentric arrangement of the flanges 17, 18, the heating coil 21 extends in substantially circular form relative to the center of the disc 16 but in spaced relationship therefrom. The openings 22a preferably have considerably larger diameter then the external coil diameter.

A pair of contact prongs 24, 25 are supported and suitably insulated from an electric plug receiving socket 26 that is attached by these prongs to a flange 27 upstanding from the plate 16. The insulation 28a insulates these prongs from the socket 26, and similar insulation 28b insulates them from flange 27. The respective prongs 24, 25 are provided with attaching flanges or lugs 29 and the opposite ends of the heating coil 21 are conveniently hooked or otherwise attached in eyelets or junctions 29a of the respective lugs 29 so as to provide a good electrical joint at each. Inasmuch as the heating element or coil 21 must be stretched to separate the individual windings, ordinarily enough tension is provided by the heating coil itself to maintain good electrical connection with the lugs 29 at the junctions 29a when the coil ends are attached thereto.

In the assembly of the heating element construction described, the pre-stamped disc 16 with its sets of flanges 17, 18 has the socket 26 attached thereto by the prongs or terminals 24, 25. Thereafter, these assemblies are fitted with the insulating tubular members 22. Then the heating coils 21 are threaded through these tubular elements 22 and their ends joined at 29a to the lugs 29 of the electrical prongs 24, 25. The tubular elements or members 22 serve not only to support the heating coil 21 but maintain it in spaced and insulated relationship relative to the flanges or supports 17, 18 and the metal disc 16. Furthermore, with the construction described, a minimum surface area of the heating coil 21 is covered by the insulating material of the members 22. As a result, a maximum amount of the heat developed in the coil 22 upon passage of an electric current can be used effectively for heating either by direct radiation or by convection. That is, the insulating members 22 have such a small comparative area as to be negligible insofar as impairment of heating efficiency is concerned. This is an important aspect of the invention because it reduces the amount of electrical energy necessary to supply the required amount of heat for effective heating in household units, such as corn poppers or food warmers or the like.

Such assembled heating unit 15 is inserted into the base 10 with the plate or disc 16 in frictional engagement with the inner wall of said base and the prongs 24, 25 extending outwardly through an opening 30 in a portion of the wall of said base.

A heater plate 31 is fitted within the base 10 overlying the heating unit 15 and lying in spaced relationship from the coil 21. This cover plate 31 is admeasured in diameter to fit frictionally within said base 10 and is, furthermore, retained thereon by the peripheral bead 32, constituting a shoulder, provided in the walls of base 10. The heater plate 31 is of metallic material suitable for such purposes.

The corn popping pan 11 has relatively deep cup shape and is reduced somewhat in diameter at its bottom end. The reduced portion 11a is admeasured in diameter to fit telescopically and removably within the upper open end of the base 10 and to rest upon the bead or shoulder 32. The bottom of the pan is provided with flutes or grooves 33. When the pan rests upon the bead 32, the fluted bottom is spaced from the heating plate 31. A handle 34 of conventional form is attached to the pan 11 as by the bolt 35 and nut 36. This handle, preferably is of the same material as the feet 13 although it may be of any desirable material.

The cover or lid 12 has a portion 37 admeasured to fit telescopically and removably within the open top of the pan 11. A bead or limiting member 38 supports the cover 12 from the upper rim of the pan 11. The cover is perforated at 39 in its top to provide escape openings for steam or other gases developed during popping of corn. A knob or handle 40 is secured to the cover, for example, by the tubular hollow rivet 41. This rivet in turn serves as a bearing for the shaft portion 42a of an agitator 42 that projects into the pan 11. The agitator is bent externally of the cover 12 to form a crank portion 42b to which a suitable manipulator knob 43 is attached. Both knobs 40 and 43 are preferably of the same material as that of feet 13 although other suitable materials may be used.

With the apparatus described the cover 12 is removable from the pan 11 for independent cleaning. In turn the pan 11 is removable from the base 10 for independent cleaning so that the heating unit 15 contained within the base 10 will not be subject to damage by water or soap used in cleaning pan 11. An additional feature resulting from removability of the popping pan 11 is that the base 10 with its level heating plate 31 and contained heating unit 15 can be utilized as an electric stove for various purposes such as heating water, making coffee, brewing tea or the like. Since the heating element 15 is completely enclosed within the base 10 by the cover 31, no heat loss by direct convection from the coil 21 can take place. As a result, the operating temperature of the coil 21 necessary to heat the plate 31 and popping pan 11 sufficiently for a reasonable popping time is less than that required with open or exposed heating units and coils. Moreover, the complete enclosure of the heating element 15 reduces the possibility of damage to its coil 21 considerably. Likewise, an insulating plate 40 of asbestos or the like on the disc 16 reduces the heat transmitted downwardly to prevent damage to the surface on which the popper is mounted.

While a specific embodiment of the invention has been disclosed, it is to be understood that changes in structural detail are possible and contemplated. There is no intention, therefore, of limitation to the exact details shown and described.

What is claimed is:

1. In a device of the character described, a base member having substantially cup-like configuration, an electric heating coil supported within said base member, a cover plate overlying said heating coil and enclosing it within said base member, a popping pan having a portion of reduced diameter, said portion being adapted to fit telescopically but removably within the base member above said cover plate, a shoulder on said base member for retaining said cover plate within said base member and for spacing the bottom of said popping pan from said cover plate, a removable cover for said popping pan and agitator means rotatively supported therefrom.

2. In a device of the character described, a base member, a plate-like member supported within said base member, sets of flanges upstanding from a face of said plate-like member, means for supporting tubular insulating members between the flanges of upstanding sets, an electric heating coil threaded through the tubular insulating members, electric terminals to which said heating coil is joined with good electrical contact, said terminals being supported insulatively from a portion of said plate-like member and extending outwardly of an opening in said base member, a cover plate also supported within said base member and overlying said heating coil and enclosing it completely within said base member, a popping pan, said pan having a portion of reduced diameter admeasured to fit telescopically and removably within said base member above said cover plate, and bead means on said base member for retaining said cover plate within said base member and for maintaining the telescopically mounted pan spaced from said cover plate.

3. In a device of the character described, a base having substantially cup-like configuration, a plate-like metallic member frictionally supported within said base, sets of parallelly arranged flanges upstanding from a face of said member, each of the flanges having a longitudinally extending slot spaced from the said face, tubular insulating elements, said elements each having an annular projection or bead engaging on opposite sides of the element between a pair of oppositely facing slots of the flanges of a set and being thereby supported in spaced relationship from said face of said member, an electrical heating coil threaded through the so supported tubular elements, electrical terminals, a plug receiving socket to which said terminals are insulatively secured, a flange upstanding from said plate-like member to which said terminals are also insulatively secured, said terminals extending outwardly of an opening in said base, means for attaching said coil to said terminals, a cover plate also supported frictionally within said base and overlying said heating coil, and enclosing it completely within said base, a popping pan, said pan having a portion admeasured to fit telescopically and removably with said base above said cover plate, and bead means on said base for maintaining said cover plate within said base and for positioning the bottom of said pan when in said base above said cover plate and in spaced relationship therefrom.

4. In a device of the character described, a base member having substantially cup-like configuration, feet secured to said base member, a plate-like member supported frictionally within said base member, sets of parallelly arranged spaced apart flanges upstanding from said plate-like member, each of said flanges having a longitudinally extending slot, with the slots of the flanges of each set extending in substantial parallelism with each other and substantially perpendicular to the face of said plate-like member, tubular insulating elements provided with surface projections extending into the slots of the flanges, one such element only being supported between flanges of a set, an electrical heating coil threaded through the tubuluar elements so supported, electrical terminals insulatively supported from said plate-like member and extending outwardly of said base member through an opening in the latter, said heating coil being joined electrically to said terminal, a cover plate frictionally supported within said base above said coil and in spaced relationship therefrom, said base member having an annular bead above said cover plate to retain it permanently in place, said bead lying below the upper edge of said base member, a popping pan having a portion admeasured to fit telescopically but removably within said base member and to rest upon said bead in spaced relationship from said cover plate, a removable cover for said popping pan, and agitator means supported from said removable cover.

ADOLPH F. SHAFTER.

REFERENCES CITED

The following references are of record in the file of this patent:

UNITED STATES PATENTS

| Number | Name | Date |
| --- | --- | --- |
| 1,642,531 | Barnard | Sept. 13, 1927 |
| 1,814,754 | James | July 14, 1931 |
| 2,187,196 | Douglass | Jan. 16, 1940 |
| 2,230,488 | Gough | Feb. 4, 1941 |